Figure 1:
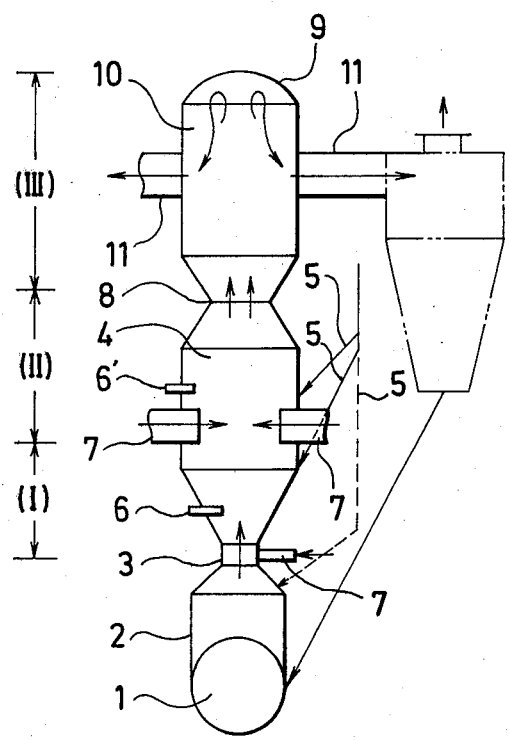

United States Patent [19]

Ikeda et al.

[11] 4,263,264
[45] Apr. 21, 1981

[54] METHOD OF ABATING NITROGEN OXIDES IN COMBUSTION WASTE GASES

[75] Inventors: Hisashi Ikeda, Matsudo; Shizuo Tsuchida, Tokyo, both of Japan

[73] Assignee: Nihon Cement Company Limited, Tokyo, Japan

[21] Appl. No.: 124,751

[22] Filed: Feb. 26, 1980

Related U.S. Application Data

[63] Continuation of Ser. No. 886,654, Mar. 15, 1978, abandoned.

[51] Int. Cl.$^3$ .............................................. B01D 53/36
[52] U.S. Cl. ...................................... 423/239; 106/100
[58] Field of Search ................ 423/235, 239; 106/100; 432/11, 72; 110/345

[56] References Cited

U.S. PATENT DOCUMENTS

| | | | |
|---|---|---|---|
| 3,838,193 | 9/1974 | Kajitani et al. | 423/235 X |
| 4,035,193 | 7/1977 | Miyamoto et al. | 106/100 |
| 4,080,218 | 3/1978 | Mori et al. | 106/100 |

*Primary Examiner*—G. O. Peters
*Attorney, Agent, or Firm*—Toren, McGeady and Stanger

[57] ABSTRACT

A method of abating nitrogen oxides in waste gases resulting from a combustion process comprises the steps of introducing the nitrogen oxides-(NOx-)containing waste gases into an enclosed furnace body having surrounding wall, at an opening of a reduced cross sectional area formed in the bottom of the furnace body, while feeding fuel and ground raw material into the furnace portion above the gas inlet opening, thus forming a jet zone, producing a reducing atmosphere in the jet zone as a result of incomplete combustion of the fuel caused by insufficient supply of air (or oxygen) for the combustion, and then bringing into mutual contact and mixing the combustion waste gases and thermal decomposition of the material, and thereby reducing the NOx in the combustion waste gases through the catalytic action of the thermal decomposition products, and an apparatus for practicing the method.

4 Claims, 2 Drawing Figures

METHOD OF ABATING NITROGEN OXIDES IN COMBUSTION WASTE GASES

This is a continuation of application Ser. No. 886,654, filed on Mar. 15, 1978 abandoned.

This invention relates to a method and an apparatus for decreasing the levels of nitrogen oxides in waste gases resulting from a combustion process.

The ordinary cement kiln equipped with a suspension preheater (hereinafter called an "SP kiln" for brevity) is designed so that the whole quantity of heat required for the preheating, thermal decomposition, and burning of raw material is supplied at the firing end of the kiln. Consequently, the combustion gases must all be heated to a high temperature range (1600°–1800° C.) above the point (1450° C.) deemed necessary for the burning to form clinker, and it is known that the gases at such elevated temperatures will have NOx concentrations of 250 ppm or upwards.

A variety of attempts have heretofore been made to reduce the NOx emission. However, no technique has yet been developed which will achieve a remarkable effect without seriously affecting the thermal efficiency or accompanying any trouble in operation, such as objectionable coating.

The recently developed SP kiln equipped with a calciner is designed to divert from 40 to 60% of the fuel from the firing end of the kiln and supply it direct to the separate calciner for thermal decomposition (decarbonation of limestone), in view of the fact that, of the stages of burning raw material for cement manufacture, the process of thermal decomposition (calcination) consumes a particularly large proportion of the fuel. Since the decarbonation of limestone takes place as an endothermic reaction at 800°–900° C., a stable combustion atmosphere at low temperatures in the range of 850°–950° C. is maintained in the calciner as long as part of the undecomposed material is present. Therefore, the so-called thermal NOx that result from the combustion inside the calciner is only a trace. This means that the total NOx emission from the equipment is proportional to the percentage of fuel feed to the firing end of the kiln, and is theoretically less than a half of the emission from the SP kiln without the calciner. Although the amounts of NOx thus reduced vary widely with the calciner type kilns now in use, depending on their construction and operating conditions, many of actually measured values indicate the possibility of further improvement in the NOx emission.

It is an object of the present invention to provide, for an apparatus for preheating and burning a ground material, whose operation can be separated into a process of thermal decomposition at low temperatures (usually below 1000° C.) that accompanies an endothermic reaction and a burning process at higher temperatures, a technique for not only minimizing the formation of NOx but also positively reducing the NOx that have resulted from the process of combustion, in a calciner of a unique construction.

Another object of the invention is to provide a method of abating NOx characterized in that, within a calciner of integral construction, a jet zone of ground material having a reducing atmosphere at a constant temperature is formed, and NOx-containing combustion waste gases are passed through the atmosphere, so that the NOx are reduced with the calcined product of the material as the catalyst, and also to provide an apparatus for practicing the method.

Figure 2:
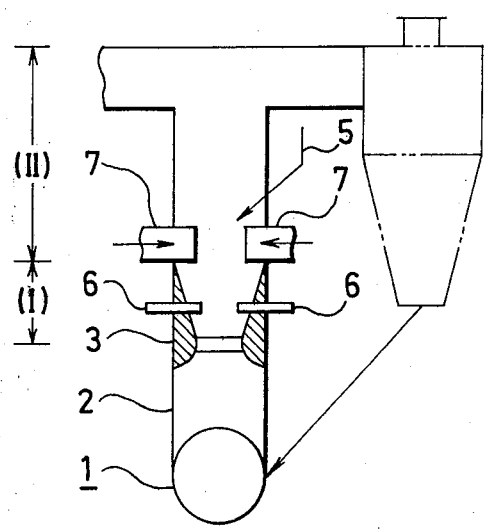

The invention will now be described in more detail in connection with preferred embodiments of the invention for burning cement materials illustrated in the accompanying drawing, in which:

FIG. 1 is a schematic view of an apparatus according to the invention for decreasing NOx contents of combustion gases; and FIG. 2 is a schematic view of a NOx-reducing apparatus according to the invention, in the form of a modification of an ordinary SP kiln.

Referring to FIG. 1, a kiln 1 is shown as connected with an riser duct 2, which terminates at the top with an opening 3 for introducing waste gases from the kiln upward into the zones now to be described. The opening, or gas inlet 3, is by far the smaller in cross sectional area than the duct 2, and it thus forms a neck. Immediately connected to the inlet 3 is a calciner 4, which includes chutes 5, a burner 6, and secondary air inlets 7. An additional secondary air inlet 7 is formed through the surrounding wall of the gas inlet 3. In the upper part of the calciner 4 is formed a constriction 8. The calciner has an impingement dome 9 at the top and next to an enlarged space 10, which has gas discharge pipes 11. The space inside the calciner consists of a jet zone (I), a suspension zone (II), and a mixing zone (III).

In the arrangements shown in FIG. 1, the waste gases from the kiln 1, at a temperature between 1000° and 1300° C. after the heat exchange with the raw material in the rotary kiln, are introduced in the form of an upward jet through the inlet 3 into the calciner 4. Raw material preheated to 550°–650° C. is fed by the chutes 5 into the calciner 4. The material feed is fluidized by the upward jet of kiln gases and is partly calcined, forming the jet zone (I) of the cement material and calcined product (CaO) above the kiln gas inlet 3. Endothermic decomposition of the raw material keeps the jet zone (I) at 820°–950° C., a temperature range lower than that of the combustion waste gases.

The jet zone (I) is further supplied with fuel by the burner 6, in an amount more than enough for consuming the excess air contained in the kiln gases. Then, part of the fuel burns, while the rest is rapidly decomposed, by the vigorous intermixing action and the heat (820°–950° C.) in the zone, into such reducing substances as CO, $H_2$, and $CH_4$, thus creating a highly active, reducing atmosphere within the zone.

In this reducing atmosphere at 820°–950° C., the molecules of nitrogen oxides (NOx), introduced together with the waste gases into the calciner at the kiln gas inlet 3, are quickly reduced through repetition of violent impingement and dispersion with the cement material and calcined matter (CaO) in the jet zone.

The ratio at which the NOx in the kiln gases are reduced can be controlled with the feed to the jet zone (I). Usually, the amount of fuel needed for reducing the total amount of the NOx is approximately 20% of the fuel requirement for the burning of cement material, whereas 60% of the fuel must be consumed for calcination. The latter therefore is theoretically enough for decreasing the total NOx emission from the entire burning equipment to a negligible trace.

Immediately above the jet zone (I) is formed the suspension zone (II), in which the material fed from the chutes 5 and the calcined product (CaO) are suspended. In addition, unburned fuel and the fuel supplied by the burner 6 flow upward from the jet zone (I) into this zone (II). A sufficient amount of secondary air for the complete combustion of the fuel mixture is admitted to the zone through the secondary air inlets 7. The fuel mixture, gasified in the jet zone (I) and replenished with oxygen in the suspension zone (II), burns rapidly to calcine the cement material. The combustion in the suspension zone (II) does not occur at temperatures above 950° C., because of heat absorption due to decomposition of the suspended material. This eliminates the possibility of the combustion yielding NOx anew.

The amount of fuel to be directly supplied to the suspension zone (II) depends upon the purpose of combustion. When the reduction of NOx is aimed at, all of the fuel is supplied from the burner 6 to the jet zone (I), not to the suspension zone (II). Where an improvement in the calcination rate is desired, in addition to the NOx reduction, the fuel is fed to the both zones (I) and (II) by burners 6 and 6', respectively.

Under certain operating conditions, as has often been witnessed with conventional calciners, a small amount of unburned fuel may sometimes be found in the gases leaving the suspension zone (II) after practically complete combustion. Even with a larger equipment, 100% combustion of the fuel is difficult. In actual operation, an attempt for the complete combustion not only results in a heat loss but also tends to cause troubles, such as objectionable coating during the preheating process. An effective counter-measure, in accordance with the invention, is the provision of the mixing zone (III) above the suspension zone (II), the uppermost zone (III) comprising the constriction 8, impingement dome 9, enlarged space 10, and the gas outlets 11. The stream of combustion gases including the unburned fuel that has moved upward from the suspension zone (II) is accelerated by the constriction 8, impinges upon the dome 9, tumbles back while being mixed up, and flows from the enlarged space 10 toward the outlets 11. During this, the unburned fuel burns out.

In experiments according to the invention, kiln gases containing from 400 to 500 ppm of NOx (in terms of 10% $O_2$) were treated. The result was that the NOx contents of the gases at the outlets 11 were decreased to 50–60 ppm (in terms of 10% $O_2$).

In accordance with the invention, excellent functions of a calciner, i.e., in all aspects of fuel gasification, decomposition of the material, and contact between the calcined product and NOx, can be performed in the integrated vessel, through the provision of a particulate jet zone of kiln gases as the fundamental zone. The apparatus for those purposes is extremely simple in construction and is advantageous over any of existing equipment in both initial investment and running cost.

The present invention is not merely embodied in the form of a calciner of a newly built kiln. As indicated in FIG. 2, the upright duct 2 above an ordinary SP kiln system may be slightly modified, by the provision of a venturi-like throat 3, burners 6, and secondary air inlets 7, to decrease the NOx proportions in the waste gases with ease.

What is claimed is:

1. A method for decreasing the nitrogen oxides in hot waste gases from the thermal decomposition product of cement raw materials in a kiln, comprising
    (a) passing the hot waste gases containing the decomposition product of the raw material from the kiln into a first jet zone above the kiln,
    (b) feeding fuel and additional ground raw material into the jet zone under conditions of insufficient oxygen supply so as to result in incomplete combustion of the fuel and formation of a reducing atmosphere in the jet zone,
    (c) mixing the waste gas and the thermal decomposition product in said jet zone to cause reduction of the nitrogen oxides in the waste gases through the catalytic action of the decomposition product,
    (d) forming a suspension zone (II) of the ground raw material above said jet zone,
    (e) feeding fuel and raw material to said suspension zone while supplying zone (II) with a sufficient amount of air for the complete combustion of the fuel as well as any unburned fuel ascending from said jet zone (I), thereby calcining the raw material and by utilizing an endothermic decomposition reaction, burning said fuel and unburned fuel from the jet zone, and
    (f) forming a gas mixing zone (III) above said suspension zone (II), and conducting the waste gases that have resulted from the combustion in said suspension zone (II) into said gas mixing zone (III) of a furnace body including a constriction of a gas flow passage formed immediately above said suspension zone, a dome on the inner surface of which the gas stream impinges, and an enlarged space, thus producing a mixing action due to changes in the velocity and direction of the combustion waste gas flow within said vessel and thereby burning the remaining unburned fuel in said combustion gases.

2. The process of claim 1 wherein the jet zone is kept at a temperature of from about 820° to 950° C.

3. The process of claim 1 wherein the temperature in zone (II) is less than about 950° C.

4. The process of claim 1 wherein the raw material is preheated to about 550° to 650° C. before introduction to the jet zone.

* * * * *